E. F. BRADFORD & V. R. PEIRCE.
SEWING-MACHINE TRIMMERS.

No. 191,750. Patented June 12, 1877.

Witnesses:
H. Chadbourn.
W. H. Edwards

Inventors:
Erastus F. Bradford
and
Vernon R. Peirce
by Alban Andrew
Their atty.

UNITED STATES PATENT OFFICE.

ERASTUS F. BRADFORD AND VERNON R. PEIRCE, OF BOSTON, MASS.

IMPROVEMENT IN SEWING-MACHINE TRIMMERS.

Specification forming part of Letters Patent No. 191,750, dated June 12, 1877; application filed March 12, 1877.

*To all whom it may concern:*

Be it known that we, ERASTUS F. BRADFORD and VERNON R. PEIRCE, of Boston, in the county of Suffolk and State of Massachusetts, have jointly invented certain new and useful Improvements in Sewing-Machine Trimmers; and we do hereby declare that the following is a full, clear, and exact description thereof, which will enable others skilled in the art to which it appertains to make and use the same, reference being had to the accompanying drawings, and to letters of reference marked thereon, which form a part of this specification.

Our invention relates to improvements upon the patent granted to us on the 16th day of May, 1876, No. 177,371, for sewing-machine trimmers; and consists in providing the trimmer-bar with a connecting-pin, actuated by a spring, which pin fits into a hole in the feed-dog of the sewing-machine in connection with which the trimmer is used.

The object of this improvement is to be able to remove the trimmer quickly from the machine without taking away the needle-plate or any screw thereon, as is required for the purpose of sharpening the knife, or to be able to remove the knife altogether when it is desired to stitch without trimming the work.

Our improvement is also very desirable for the purpose of being able to detach the trimmer-bar instantaneously from its operating mechanism, so as to enable the operator to work the trimmer by hand on a line parallel with the feed, as may be required when it is desired to trim without sewing the work. When it is required to sew without trimming the work the trimmer may be removed altogether, as above named, or it may be disengaged from its operating mechanism, and pushed back far enough so as to allow the work to be fed forward without coming in contact with the disengaged trimmer. The trimmer-bar can easily be connected to its reciprocating driver by simply moving it parallel with the feed till the pin aforesaid comes directly over the hole or opening in the said driver, when the spring in connection with the said pin automatically locks the trimmer-bar and feed-bar together. The said locking-pin is provided with a small knob or projection on its upper end, above the trimmer-bar, by which the said pin can be easily disengaged from its driver, removed altogether, or operated independent of the same, as may be required. The knife may run in a slot on the needle-plate, as shown in our patent of May 16, 1876, or on the side of the needle-plate, parallel to the line of the feed.

Figure 1:
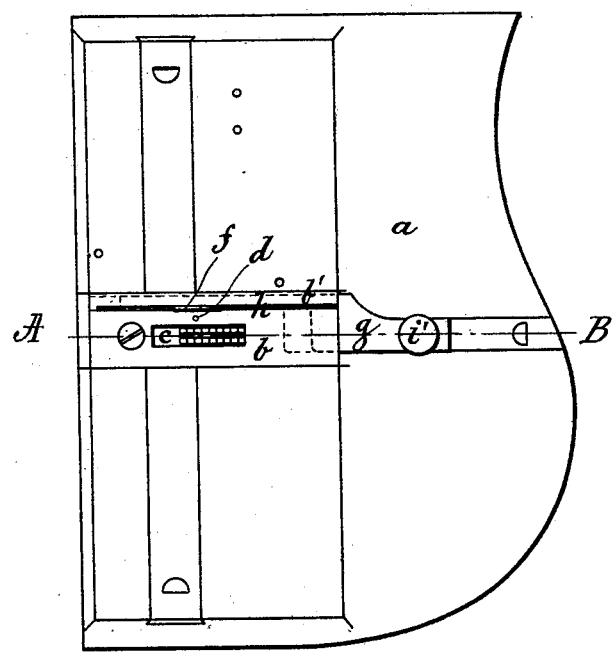
Figure 2:
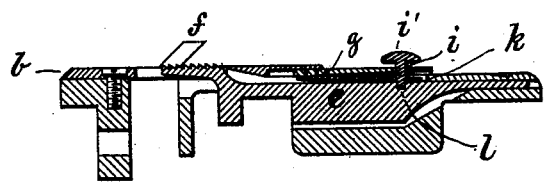
Figure 3:
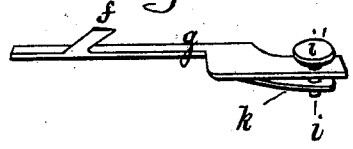

On the accompanying drawings, Figure 1 represents a plan view of a portion of a sewing-machine bed, and our invention connected thereto. Fig. 2 represents a cross-section on the line A B, (shown in Fig. 1,) and Fig. 3 represents a perspective view of our improved trimmer-bar.

Similar letters refer to similar parts wherever they occur on the different parts of the drawings.

$a$ represents an ordinary sewing-machine bed, on which $b$ represents the needle-plate, having the feed-hole $c$ and needle-hole $d$, in the usual manner. $e$ represents the feed-dog, as usual. $f$ represents the trimmer, made in one piece with the trimmer-bar $g$, that is movable in suitable guides parallel to the line of feed of the work. The trimmer $f$ projects upward from below in a slotted opening, $h$, in the needle-plate $b$, as usual; but this slot is not necessary, as the trimmer may move on the edge of the needle-plate, as before stated, in which case that portion of the needle-plate marked $b'$ is dispensed with.

Through the forward projecting end of the trimmer-bar $g$ is made a hole, through which the connecting-pin $i$ is made to play loosely. This pin is provided in its upper end above the trimmer-bar with a knob or projection, $i'$, by which the said pin can be adjusted and operated. A spring, $k$, is secured to the under side of the trimmer-bar, and the forward end of said spring is secured to the pin $i$, so as to press the said pin automatically downward. The lower end of said pin $i$ fits into a corresponding hole or recess, $l$, in the feed-dog $e$, as heretofore set forth.

It will thus be seen that the trimmer-bar can be quickly detached from its operating mechanism for any of the purposes above named, without the need of removing the needle-plate or any screw, simply by raising the pin $i$ out of its hole or recess $l$, when the trimmer-bar can immediately be removed altogether from the needle-plate, or allowed to remain stationary during the progress of sewing, or operated by hand independent of the feed of the work.

Having thus fully described the nature, construction, and operation of our invention, we wish to secure by Letters Patent and claim—

The trimmer-bar $g$, constructed with the upwardly-projecting trimmer $f$, and having the pin $i$ passing through an opening in the trimmer-bar, and having a knob, $i'$, in combination with the flat spring $k$, attached at one end to the under side of the trimmer-bar, and connected at its other end to the pin $i$, substantially as described, the trimmer-bar being adapted to be connected to the feed-dog of a sewing-machine, for the purpose set forth.

In testimony that we claim the foregoing as our own and joint invention we have affixed our signatures in presence of two witnesses.

ERASTUS F. BRADFORD.
VERNON R. PEIRCE.

Witnesses:
ALBAN ANDRÉN,
HENRY CHADBOURN.